No. 860,227. PATENTED JULY 16, 1907.
J. MOREAU.
POTATO DIGGER.
APPLICATION FILED OCT. 24, 1906.
3 SHEETS—SHEET 1.
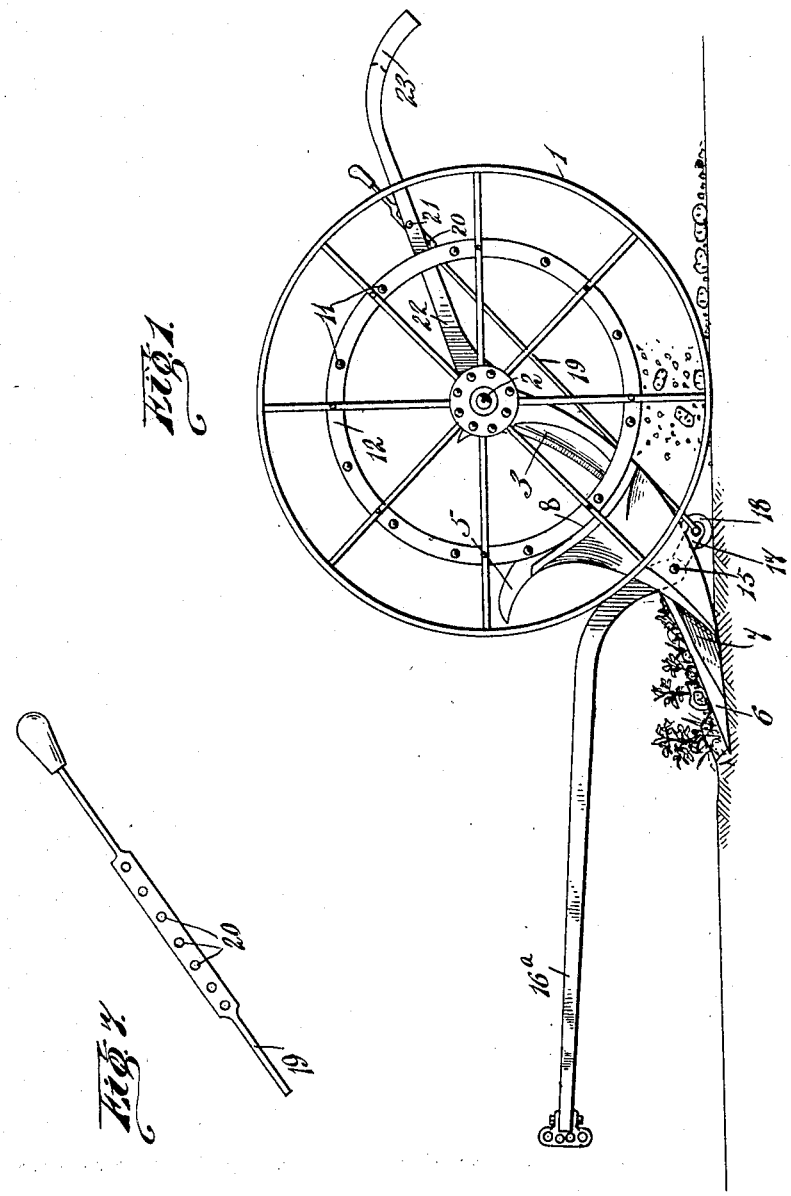
Witnesses:
Eugene McSliney
C. C. Cousins
Joseph Moreau, Inventor,
By Marion & Marion
Attorneys No. 860,227. PATENTED JULY 16, 1907.
J. MOREAU.
POTATO DIGGER.
APPLICATION FILED OCT. 24, 1906.
3 SHEETS—SHEET 2.
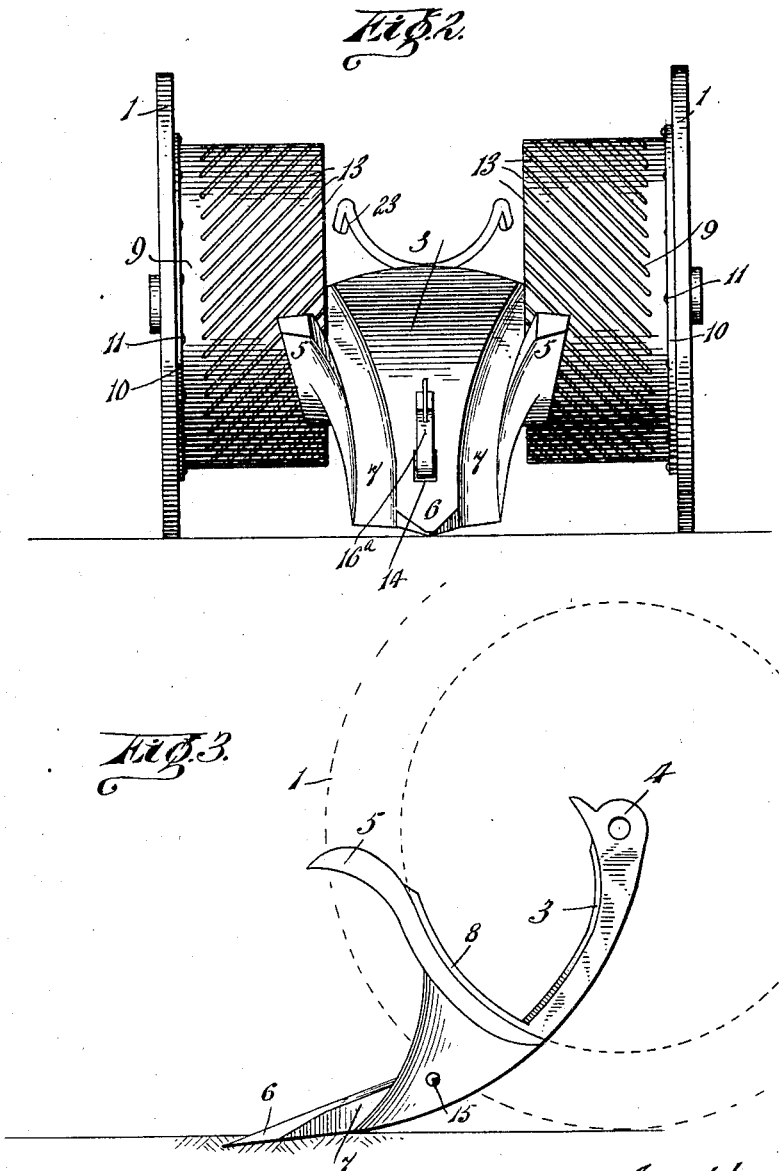

No. 860,227. PATENTED JULY 16, 1907.
J. MOREAU.
POTATO DIGGER.
APPLICATION FILED OCT. 24, 1906.
3 SHEETS—SHEET 3.
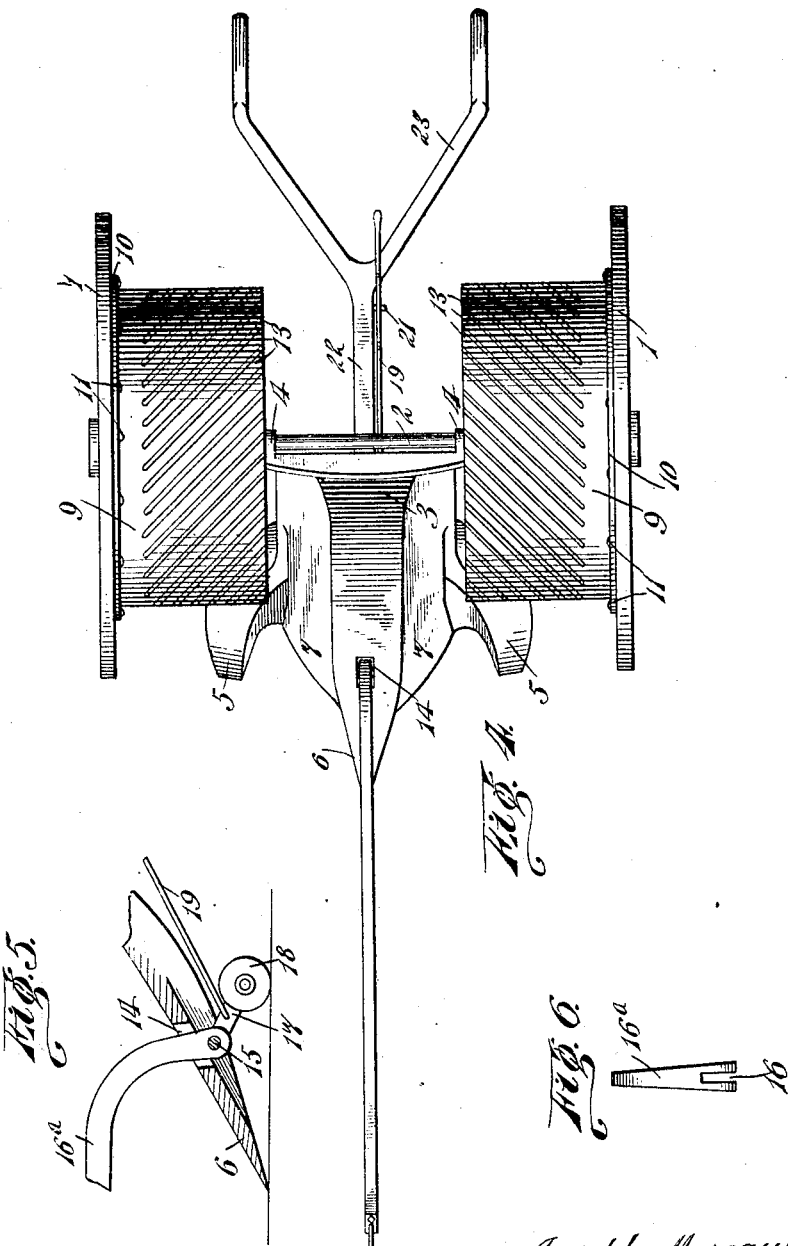

UNITED STATES PATENT OFFICE.

JOSEPH MOREAU, OF ST. GERMAIN DE GRANTHAM, QUEBEC, CANADA.

POTATO-DIGGER.

No. 860,227.  Specification of Letters Patent.  Patented July 16, 1907.

Application filed October 24, 1906. Serial No. 340,314.

*To all whom it may concern:*

Be it known that I, JOSEPH MOREAU, a subject of the King of Great Britain, residing at St. Germain de Grantham, in the county of Drummond, Province of Quebec, Canada, have invented certain new and useful Improvements in Potato-Diggers; and I do hereby declare that the following is a full, clear, and exact description of the invention, such as will enable others skilled in the art to which it appertains to make and use the same.

My invention relates to potato diggers; the object of my invention is to provide a simple and efficient implement for digging potatoes and similar vegetables, and for separating the same from their vines and the soil; a more specific object is to provide an easily operated means for regulating the depth of the cut of the implement; and, my invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a side elevation; Fig. 2 is a front elevation; Fig. 3 is a fragmentary detail in side elevation of the digging member; Fig. 4 is a plan view of the implement; Fig. 5 is a fragmentary detail in longitudinal vertical section, taken through the lower and forward end of the digging member, and illustrating in side elevation the regulating means for adjusting the depth of the cut; Fig. 6 is a rear elevation of the rear end of the beam; and Fig. 7 is a fragmentary detail in side elevation of the upper portion of the depth regulating handle.

Referring to the drawings, 1 designates the wheels carrying a supporting shaft or axle 2. A segmental member 3 is provided with ears 4 rockably disposed on the shaft 2. On each side of the segmental member 3 are secured or formed the forwardly extending outwardly flared curved wings 5, adapted to catch the vines as the potatoes are dug, and to throw the vines to either side. A digging member 6 is formed or secured to the member 3, and follows the segmental curve of the member 3 and projects above the plane thereof, and projects forwardly thereof, at which portion the digging member is pointed and sharpened.

The digging member 6 extending above the plane of the member 3, leaves the channels 7, which are curved and follow the segmental contour of the member 3, so that potatoes and soil dug by the digging member 6 are carried upward and thrown to either side as the implement is advanced. The rear sides of the curved wings 5 are provided with the curved channels 8, in which rotate the extending flanges of the annular members 9.

The annular members 9 are provided with vertical flanges 10, secured by the rivets 11 to the rings 12 carried by the wheels 1. The horizontal extending flanges of the annular members 9 are slotted to form the fingers 13, so that the soil will sift therethrough as the implement is advanced and the wheels 1 rotate.

The digging member 6 is provided with the vertical opening 14, disposed transversely of which is a securing pin 15, passing through the bifurcation 16, at the rear and lower end of the draft beam 16ª. A link 17 is pivotally supported on the pin 15, and carries on its free end a roller 18, adapted to support the digging member 6. By adjusting the link 17, the height of the digging member 6 with relation to the ground may be changed.

A rod 19 has its lower end secured to the link 17, and its upper end is provided with openings 20, adapted to receive a pin 21, which pin is removably carried by the shank 22 of a bifurcated handle 23, which shank is secured to the rear face of the segmental member 3.

In the operation of the invention, the implement is drawn forward by means of the draft beam 16ª. The digging member enters the soil beneath the potatoes to be dug, and raises the soil, the potatoes and the vines. The digging member 6 being above the surface of the segmental member 3, the vines and other matter naturally fall to either side, where the vines are caught by the members 5, and thrown to one side and are dropped. The potatoes and soil are carried upward and backward in the channel 7, and thrown outward behind the wings 5, so that they enter the drums formed by the annular members 9. These drums being rotated by the forward movement of the implement, the soil is separated from the potatoes and passes between the fingers 13. The potatoes are finally thrown out of the drums after having been thus separated from the soil. The handle 23 being connected to the segmental member 3, and the segmental member 3 being rockably supported, the depth of the cut of the digging member 6 may be changed by means of the handle. By means of the link 17 and the rod 19, the depth of the cut may be maintained without adjustment by the handles 23.

Having thus fully described my invention, what I claim as new and desire to secure by Letters Patent, is:—

1. In a potato digger, the combination comprising a supporting axle, a pair of supporting wheels on the axle, a segmental member rockably supported on the axle and provided with upwardly extending outwardly flared wings on its opposite sides, a digging member carried by the segmental member, means for rocking the segmental member on the axle, and rotatable separating drums carried on the wheels.

2. In a potato digger, the combination comprising a supporting axle, a pair of supporting wheels on the axle, a segmental member rockably supported on the axle, and provided with wings on its opposite sides, a digging member carried by the segmental member and extending above the plane thereof to form channels on each side, means for rocking the segmental member on the axle, and rotatable separating drums carried on the wheels.

3. In a potato digger, the combination comprising a supporting axle, a pair of wheels carried on the axle, a segmental member rockably supported on the axle, a digging member carried by the segmental member, a draft beam pivoted to the digging member, a rockable depth regulating member pivoted to the digging member, means for locking the rockable member against movement, and rotatable separating drums carried on the wheels.

4. In a potato digger, the combination comprising an axle, supporting wheels on the axle, a rockable segmental member carried by the axle, a digging member carried by the segmental member, a link rockably connected to the digging member, a roller on the link, a rod connected to the link, means for locking the rod against movement, and drums fixed on the supporting wheels.

5. In a potato digger, the combination comprising an axle, supporting wheels on the axle, a rockable segmental member carried by the axle, a digging member carried by the segmental member, a link rockably connected to the digging member, a roller on the link, a rod connected to the link, and provided with openings, handles carried by the segmental member, a pin carried by the handles and adapted to enter the openings, and drums fixed on the supporting wheels.

6. In a potato digger, the combination comprising a supporting axle, a pair of wheels on the supporting axle, drums secured to the wheels, a segmental member rockably disposed on the axle, a digging member carried by the segmental member and provided with an opening, a draft beam having a rear bifurcated end disposed through the opening, a link disposed in the bifurcated end of the draft beam, a pin carried by the digging member and disposed through the bifurcated end of the draft beam and the link, a roller carried by the free end of the link, means for locking the link against movement, and handles secured to the segmental member and adapted to rock the segmental member and the digging member.

7. In a potato digger, the combination comprising a supporting axle, a pair of wheels on the supporting axle, a segmental member rockably disposed on the axle and provided with wings, the rear sides of which are curved, a digging member on the segmental member, means for rocking the segmental member to regulate the depth of the cut of the digging member, and annular members secured to the wheels and provided with horizontal flanges having fingers thereon.

8. In a potato digger, the combination comprising a supporting axle, a pair of wheels carried by the supporting axle, a rockable segmental member carried by the supporting axle, a digging member carried by the segmental member, means for rocking the segmental member, rings carried by the wheels, and separating drums carried by the wheels each comprising a vertical flange riveted to said rings, and a horizontal flange provided with slots to form inwardly projecting fingers.

In witness whereof I have hereunto set my hand in the presence of two witnesses.

JOSEPH MOREAU.

Witnesses:
C. C. COUSINS,
E. M. SLINEY.